(12) United States Patent
Wu et al.

(10) Patent No.: US 7,685,146 B2
(45) Date of Patent: Mar. 23, 2010

(54) APPARATUS AND METHOD FOR A COLLABORATIVE SEMANTIC DOMAIN AND DATA SET BASED ON COMBINING DATA

(75) Inventors: Ju Wu, Coquitlam (CA); Nicholas Guy Kellet, Kelowna (CA); Ronaldo Ama, Palo Alto, CA (US)

(73) Assignee: Business Objects, S.A., Dublin (IE)

( * ) Notice: Subject to any disclaimer, the term of this patent is extended or adjusted under 35 U.S.C. 154(b) by 341 days.

(21) Appl. No.: 11/864,460

(22) Filed: Sep. 28, 2007

(65) Prior Publication Data
US 2008/0109439 A1    May 8, 2008

Related U.S. Application Data

(60) Provisional application No. 60/864,356, filed on Nov. 3, 2006.

(51) Int. Cl.
*G06F 17/30* (2006.01)
(52) U.S. Cl. .................................................... 707/101
(58) Field of Classification Search ................. 707/101, 707/200
See application file for complete search history.

(56) References Cited

U.S. PATENT DOCUMENTS

| 2003/0214523 A1* | 11/2003 | Wang .......................... 345/700 |
| 2008/0059413 A1* | 3/2008 | Evans et al. ..................... 707/2 |
| 2008/0071799 A1* | 3/2008 | Evans et al. ................. 707/100 |

* cited by examiner

*Primary Examiner*—Cheryl Lewis
(74) *Attorney, Agent, or Firm*—Cooley Godward Kronish LLP

(57) ABSTRACT

A computer readable storage medium includes computer executable instructions to provide a semantic domain with a plurality of semantic definitions associated with one or more subject areas to a community of users. A data input is received from a user within the community of users. A portion of the data in the data input is linked with a semantic definition from the plurality of semantic definitions to create a mapping. The data input and the mapping are evaluated. The data input is published to the community of users.

17 Claims, 9 Drawing Sheets ns of the invention.
APPARATUS AND METHOD FOR A COLLABORATIVE SEMANTIC DOMAIN AND DATA SET BASED ON COMBINING DATA

BRIEF DESCRIPTION OF THE INVENTION

This invention relates generally to semantic layers used to interface with data sources. More particularly, the invention relates to a model for collaborative design of semantic abstractions based on a combination of partial data sources.

BACKGROUND OF THE INVENTION

Business Intelligence generally refers to software tools used to improve business enterprise decision-making. These tools are commonly applied to financial, human resource, marketing, sales, customer, and supplier analyses. More specifically, these tools can include: reporting and analysis tools to present information; content delivery infrastructure systems for delivery and management of reports and analytics; data warehousing systems for cleansing and consolidating information from disparate sources; and data management systems, such as relational databases, On Line Analytic Processing (OLAP) systems, or other data sources used to collect, store, and manage raw data.

In many organizations data is stored in multiple formats that are not readily compatible, such as relational and OLAP data sources. Additionally, in many organizations it is desirable to insulate a user from the complexities of the underlying data source. Therefore, it is advantageous to be able to work with data using a semantic layer that provides terms and abstracted logic associated with the underlying data. Semantic layers for relational databases are known in the art.

Systems designed to provide semantic layer definitions for underlying data within an organization are typically determined by a small group of people based on an understanding of internal data needs and existing data sources, such as relational and OLAP databases. These semantic layers or domains are not designed to be collaboratively defined with any number of business and individual definitions. Semantic layers or domains are not typically designed to be associated with partial or highly fragmented data records from a wide range of data sources and supplied by a widely disparate user base that may apply any number of business and individual definitions to the partial data.

In view of the foregoing, it would be advantageous to enhance the architecture of known semantic layers and domains to support collaborative semantic definitions of data based on a wide range of contributors to both the data set and the semantic definitions associated with the data set. Preferably, these collaborations would include adding complete or partial data records and identifying the relationship between the partial data record and an existing semantic definition, and modifying the semantic definition itself based on collaborative processes.

SUMMARY OF INVENTION

The invention includes a computer readable storage medium with computer executable instructions to provide a semantic domain with a plurality of semantic definitions associated with one or more subject areas to a community of users. A data input is received from a user within the community of users. A portion of the data in the data input is linked with a semantic definition from the plurality of semantic definitions to create a mapping. The data input and the mapping are evaluated. The data input is published to the community of users.

The invention also includes a computer readable storage medium with computer executable instructions to provide a semantic domain with a plurality of semantic definitions associated with one or more subject areas. A proposed modification to the semantic domain is received from a user within a group of users. The proposed modification is evaluated. The proposed modification is published to the semantic domain and the group of users.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

The following terminology is used while disclosing embodiments of the invention:

Semantic Domain is the term for a level of abstraction based on a relational, OLAP, or other data source or a combination of more than one data sources or existing semantic domains. The semantic domain includes data model objects that describe the underlying data source and define dimensions, attributes and measures that can be applied to the underlying data source and data foundation metadata that describes a connection to, structure for, and aspects of the underlying data source. A semantic domain can be used as a level of abstraction to combine partial data sets from any number of original data sources. A semantic domain can be used to provide logical sets to which data can be associated so that data from a wide number of sources can be meaningfully aggregated. Metadata concerning the data, such as a value for data freshness, can also be associated with the data within the logic of a semantic domain. Semantic domain technology is disclosed in the following commonly-owned U.S. Pat. Nos. 5,555,403; 6,247,008; 6,578,027; and 7,181,435, which are incorporated herein by reference.

Semantic Definition or Data Model Object is the term for an object defined within a semantic domain that represents a dimension of the underlying data source, represents relationships between dimension members and attributes, or provides calculations from, based on or designed to be applied to an underlying data source. Types of data model objects include base dimensions, base attributes, base measures, calculated dimensions, calculated attributes, and calculated measures.

Figure 1:
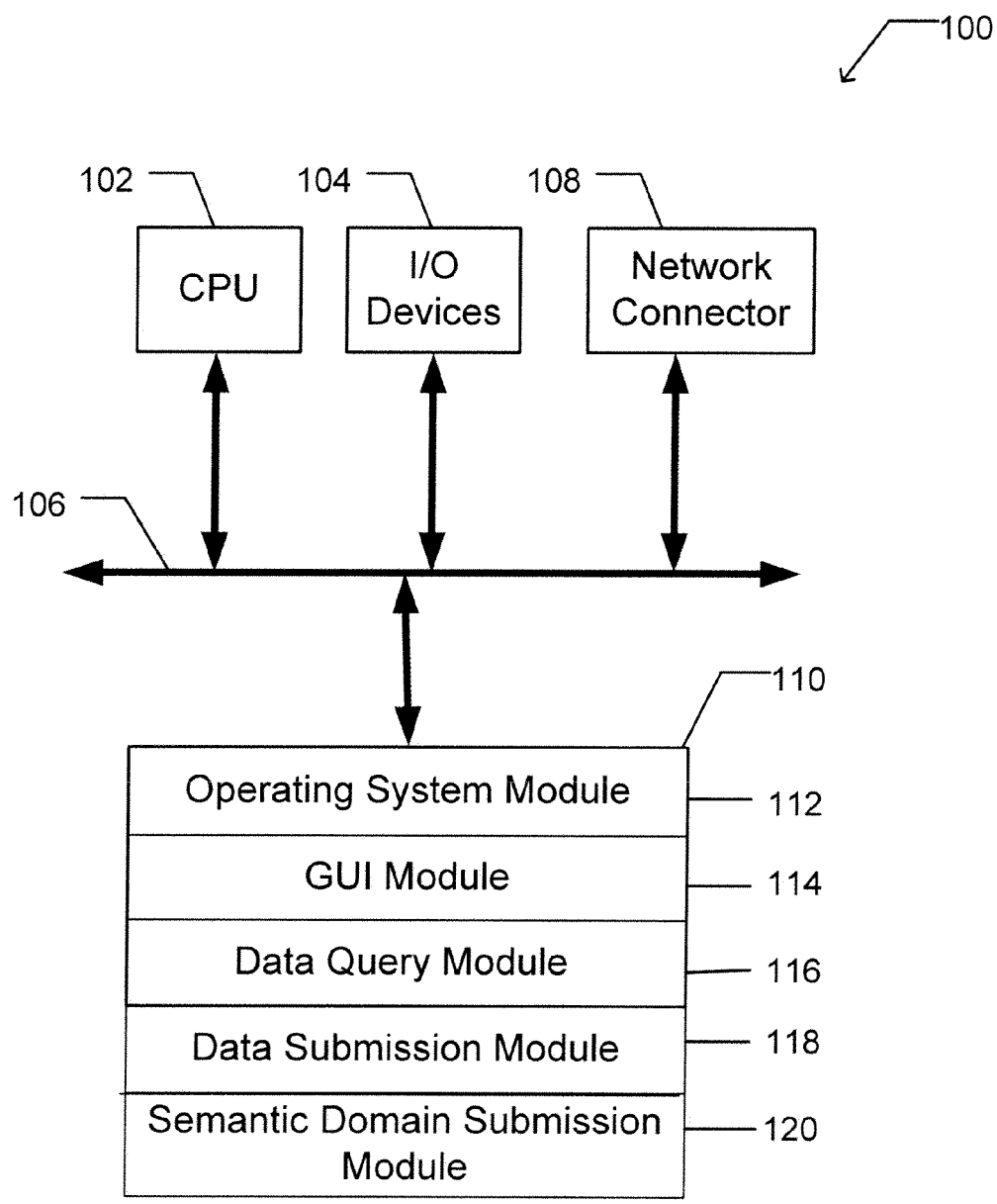
FIG. 1 illustrates a client computer constructed in accordance with an embodiment of the invention.

FIG. 1 illustrates a client device or computer 100 configured in accordance with an embodiment of the invention. The computer 100 includes standard components, including a central processing unit 102 and input/output devices 104, which are linked by an interface 106. The input/output devices 104 may include a keyboard, mouse, touch screen, monitor, printer, and the like. A network connector 108 is also connected to the interface 106. The network connector (NC) 108 provides connectivity to a network (not shown), thereby allowing the device or computer 100 to operate in a networked environment.

A memory 110 is also connected to the interface 106. In an embodiment, the memory 110 stores one or more of the following modules: an operating system module 112, a graphical user interface (GUI) module 114, a data query module 116 and a data submission module 118.

The operating system module 112 may include instructions for handling various system services, such as file services or for performing hardware dependant tasks. The GUI module 114 may rely upon standard techniques to produce graphical components of a user interface, e.g., windows, icons, buttons, menu and the like, examples of which are discussed below.

The data query module 116 includes executable instructions to perform query related functions, such as specifying, triggering, modifying, filtering, selecting, and deleting a query and the like. The data query module 116 can include executable instructions for passing user authentication, session information, and other metadata related to the query. The data submission module 118 includes executable instructions for submitting data. The data submitting instructions can include associating the data with semantic concepts, associating the data with other existing data, passing the data directly or by reference, associating metadata with the data submission, specifying the private or public terms of the data, passing user authentication, passing session information with the data. The semantic domain submission module 120 includes instructions for additions, modifications, deletions, and the like to an existing semantic domain framework or submissions of new semantic domains and can include executable instructions for passing user authentication, session information, and other metadata related to the modification. In an embodiment of the invention, data query module 116, data submission module 118 and semantic domain submission module 120 provide instructions related to submitting collaborative feedback concerning the addition, modification, deletion, and accuracy of semantic domains and data related to semantic domains.

The executable modules stored in memory 110 are exemplary. It should be appreciated that the functions of the modules may be combined. In addition, the functions of the modules need not be performed on a single machine. Instead, the functions may be distributed across a network, if desired. Indeed, the invention is commonly implemented in a client-server environment with various components being implemented at the client-side and/or the server-side. It is the functions of the invention that are significant, not where they are performed or the specific manner in which they are performed.

Figure 2:
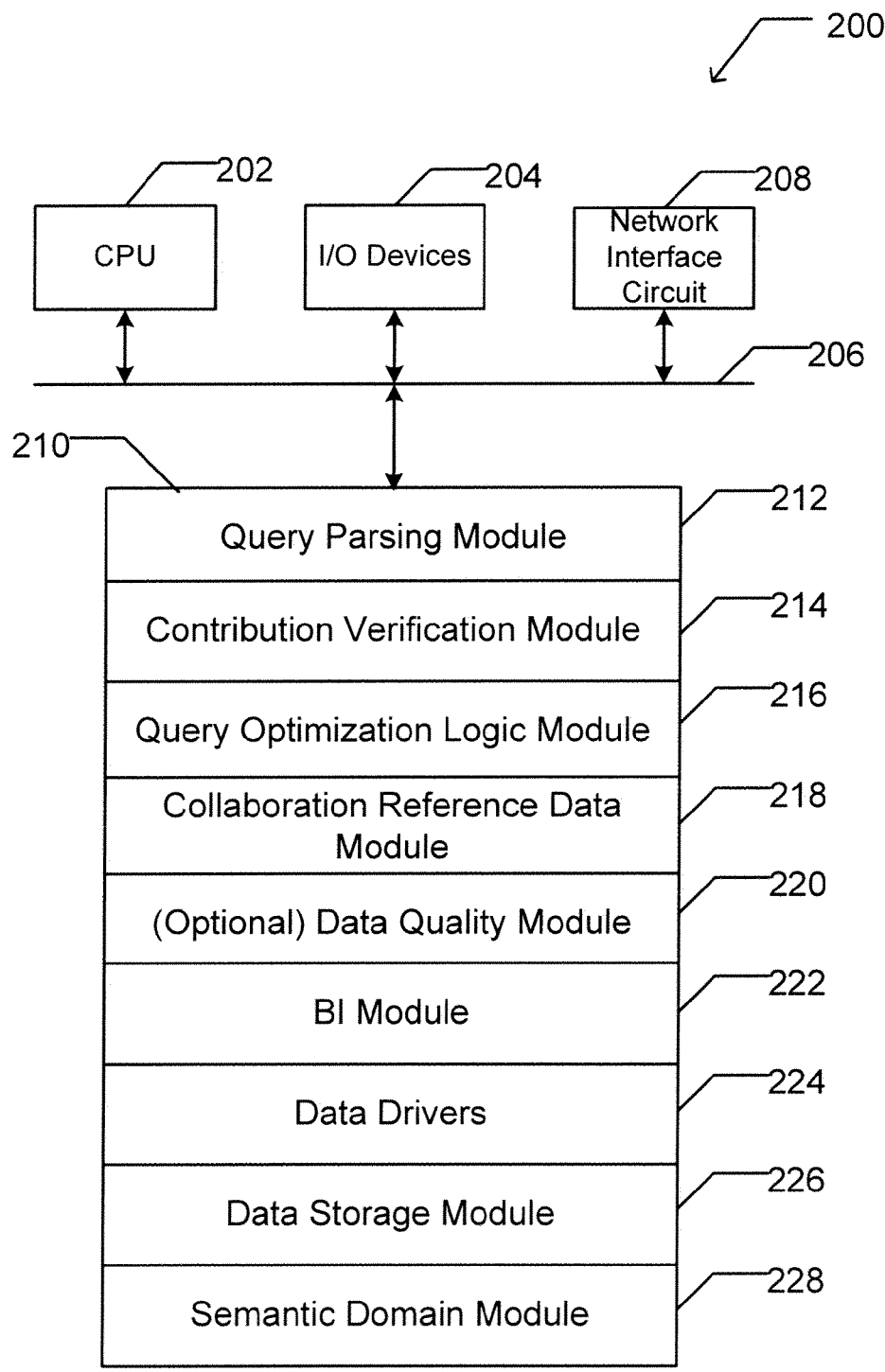
FIG. 2 illustrates a server computer constructed in accordance with an embodiment of the invention.

FIG. 2 illustrates a back end or server computer 200 configured in accordance with an embodiment of the invention. The computer 200 includes standard components, including a central processing unit (CPU) 202 and input/output devices 204, which are linked by a bus 206. The input/output devices 204 may include a keyboard, mouse, touch screen, monitor, printer, and the like. A network interface circuit 208 is also connected to the bus 206. The network interface circuit 208 provides connectivity to a network (not shown), thereby allowing the computer 200 to operate in a networked environment.

A memory 210 is also connected to the bus 206. Memory 210 stores a query parsing module 212 which includes executable instructions to parse and evaluate a query for use with data drivers 224 such that a query can be applied to data contained either within the data storage module 226 or connected to the computer on a network accessed through Network Interface Circuit 208. Contribution verification module 214 includes instructions to verify the content of the contribution based on criteria about content related to acceptable, blocked, or questionable data. In one embodiment of the invention, this verification includes comparing the data against information about the expected data type, content, or format that is associated with the mapped semantic definition. Query optimization logic module 216 includes logic for parsing queries against either the collaborative system or the external data sources such that the query is pre-processed and structured for optimal execution. In particular, query optimization logic module 216 can include instructions for handling partial data sets and returning fragmented data values to provide a usable data set. Collaboration reference data module includes executable instructions to collect, analyze and store reference data regarding such things as the user, user actions, and session as this information relates to the collaborative process. The optional data quality module 220, validates the quality of data either as it is input or that is stored within the system to validate the data against either known data (directories, existing partial data, postal information and the like), or data templates or fuzzy logic that describes an expected form for the data. The BI module 222 optionally provides enterprise authentication, session caching, semantic domain persistence, other element persistence and the like as well as optionally providing functionality typically associated with a BI system such as report design, scheduling, and viewing.

Data drivers 224 work in conjunction with the query parsing 212 and query optimization logic module 216 to access data contained either within the data storage module 226 or connected to the computer on a network accessed through Network Interface Circuit 208. Data storage module works in conjunction with other potential external data sources connected to computer 200 by Network Interface Circuit 208. In one embodiment, the data storage module is contained within BI module 222. The semantic domain module 228 includes instructions to define, modify, connect, save, and analyze semantic domains. In one embodiment of the invention, semantic domain module 228 is contained within BI module 222.

While the various components of memory 210 are shown residing in the single computer 200, it should be recognized that such a configuration is not required in all applications. For instance, the data storage module 226 may reside in a separate computer (not shown in FIG. 2) that is connected to a network through the network interface circuit 208. Similarly, the BI module 222 may reside in another computer (not shown in FIG. 2). In fact, for scalability considerations, an architecture based on multiple servers, including potentially duplicate servers, is typical. The executable instructions stored in computer memory 210 need not be in separate modules. The invention is directed toward the operations disclosed herein. There are any number of ways and locations to implement those operations, all of which should be considered within the scope of the invention.

Figure 3:
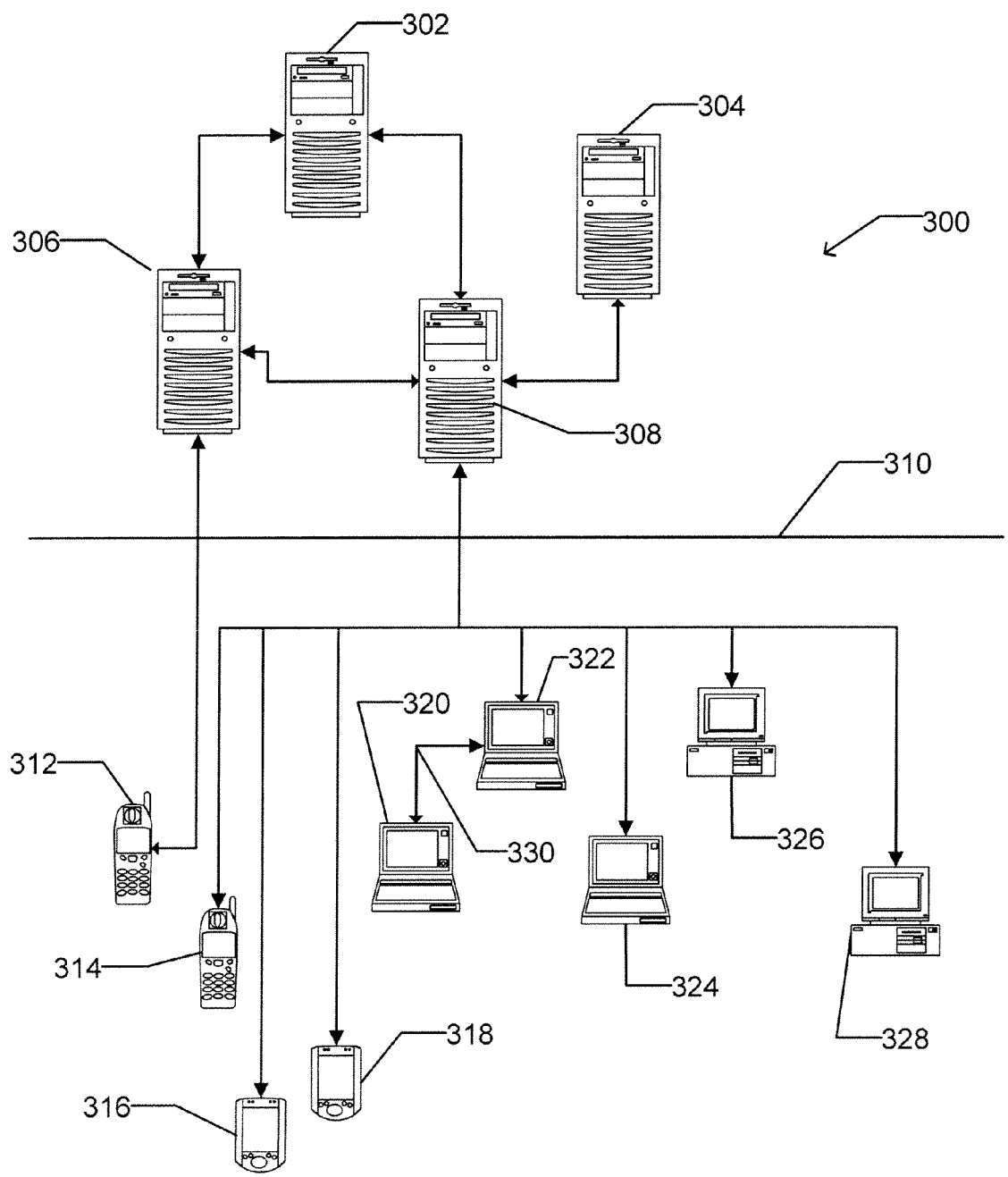
FIG. 3 illustrates an exemplary collaborative system associated with an embodiment of the invention.

FIG. 3 illustrates a system 300 configured in accordance with an embodiment of the invention where a number of clients (312-328) with functionality indicated in FIG. 1 access a number of servers (302-308) with functionality indicated in FIG. 2 in order to build a collaborative semantic domain and a collaborative set of data from various data sources that correspond to a collaborative semantic domain definition. Client devices include mobile phones 312-314, personal digital assistants (PDAs) 316-318, and various computers 320-328. Client devices may be connected to servers through an optional firewall 310, wired or wireless communication channel, signal carriers, and the like. The invention may also be implemented in a peer-to-peer fashion, exemplified by connection 330 between computers 320 and 322. The computer 322 may optionally interact with a server such as 308 or the computer 322 may itself independently act as a server and contain the functionality indicated in FIG. 2. The invention can be implemented with either peer-to-peer or client-server architecture. The invention is designed to be used by a large number of clients in order to construct a collaborative set of data and semantic domain definitions based on full or partial data sets and semantic definitions and models supplied by the clients.

Figure 4:
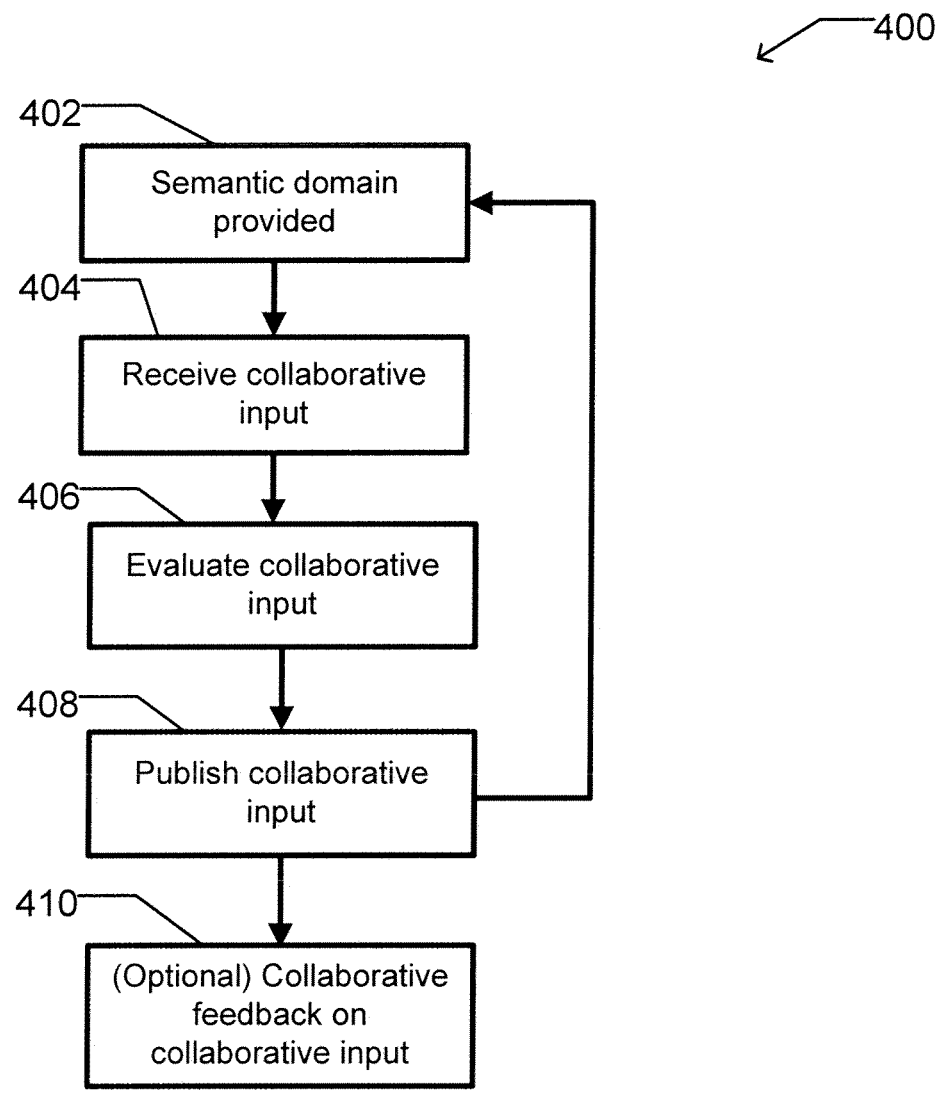
FIG. 4 illustrates a high level workflow associated with an embodiment of the invention.

FIG. 4 illustrates a high level workflow associated with an embodiment of the invention. Workflow 400 shows a high level workflow for receiving, combining and publishing data and semantic domain modifications. A semantic domain is provided 402 based on instructions within the semantic domain module 228. Semantic domains are predefined for use with the invention and provide an abstract framework to which data can be associated. For example, a semantic domain might be defined where any number of objects are defined having any number of attributes where some of these attributes may be the same between objects, be the same but have different value constraints, or be defined only for a specific object. Although an initial semantic domain is provided within the system, this semantic domain is designed to be a living framework modified by the users of the system (see FIG. 6) such that the semantic domain reflects the users' understanding and naming of the objects, attributes, calculations, and logic that is used to classify and retrieve the data.

The contribution verification module 214 receives the collaborative input 404. The client submits this data or semantic domain modification using either the data submission module 118 or the semantic domain submission module 120. Collaborative input is evaluated 406 by the contribution verification module 214 in conjunction with other modules depending on the type of collaborative input and the embodiment of the invention. Evaluation can include authenticating the user, validating the data, checking user rights and status, analyzing impact to other data, and the like. Publish collaborative input 408 occurs when evaluation criteria in 406 has been met. Publication can be public, private, available for a fee, or available in specified aggregate or anonymized formats. After collaborative input is published 408, the system is available to receive additional collaborative input. Publishing collaborative input may modify the semantic domain provided in step 402 depending on whether the collaborative input altered the definition of a semantic domain. Optionally, collaborative feedback on the collaborative input 410 can be provided by other users such that the data, user, user group, and the like can be evaluated based on the perceived value of the data or semantic domain modification. The feedback may be explicit based on ranking or comments, or implicit based on use and popularity. The system is designed to be used in a multi-threaded architecture where any number of collaborative inputs could be received from any number of clients simultaneously.

Figure 5:
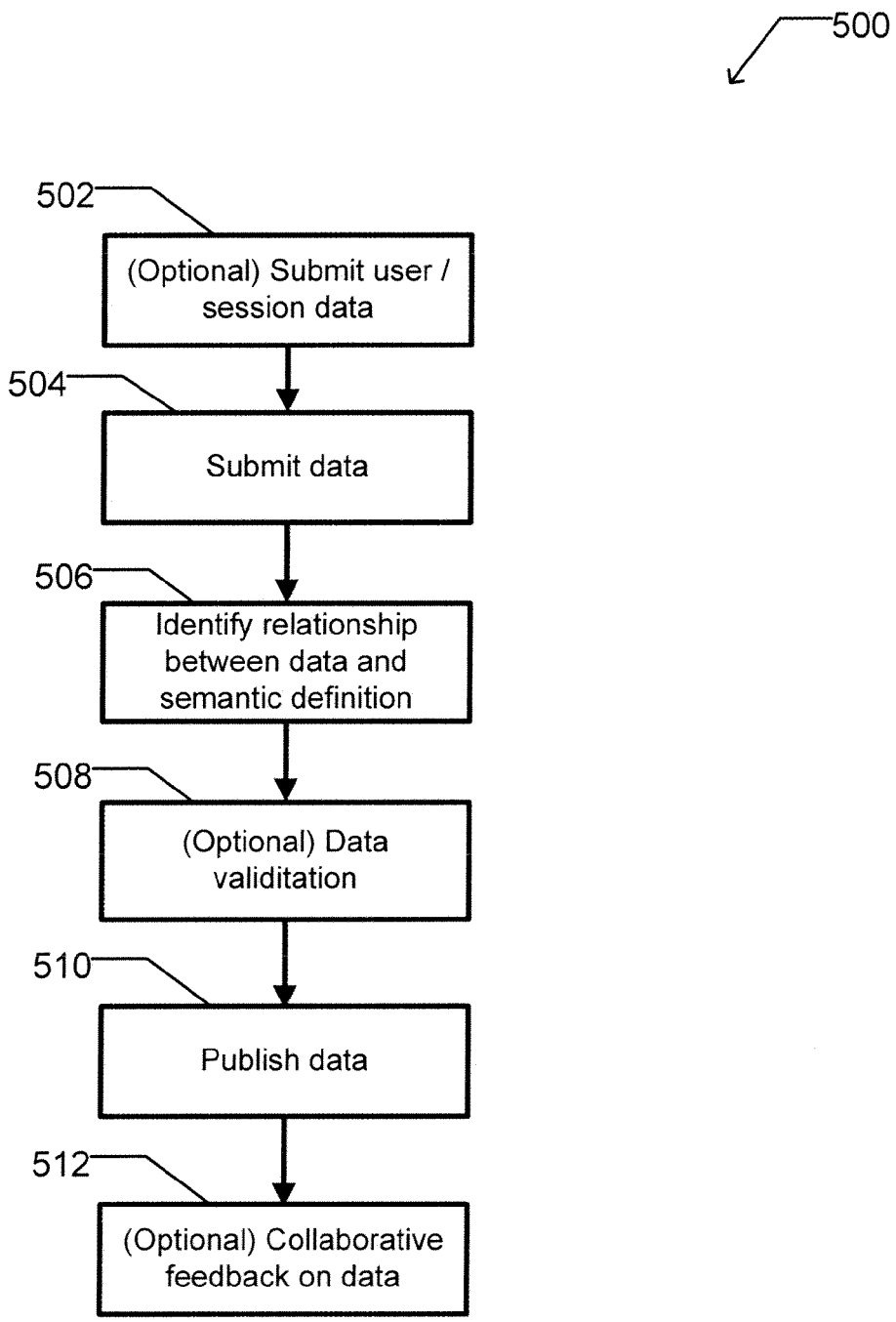
FIG. 5 illustrates a workflow for submitting data in accordance with an embodiment of the invention.

FIG. 5 illustrates a workflow 500 for submitting data where the data may be a partial or complete set of data. Optionally, user or session data is submitted by the client by either the data submission module 118 or the semantic domain submission module 120 and is handled by the collaboration reference data module potentially in conjunction with other server modules. In one embodiment of the invention, data is tracked and linked to identify the user submitting the data. Data is submitted 504. The data may be a complete or partial set of data and may describe one or more subjects. The data submission may be manual or performed in combination with automation processes, such as "screen scraping" a provided URL for content. The submitted data is linked to an existing semantic definition 506. This linking process may include explicitly linking a data item to a term in the semantic domain, linking a structure of data to terms in a definition such that columns or rows are mapped to specific terms within the semantic domain, linking structures within the semantic domain to structures within the data set submitted, and the like. Identifying relationships between the data and the semantic domain 506 may include standard concepts in the semantic domain such as data source, data submission date, language, user group affiliations, and the like.

Optional data validation occurs 508. Data validation can be against data types associated with a semantic definition, existing data within the system, address validation directories, unacceptable data values, a spell checking system, and the like. In an embodiment, non-conforming data is corrected, suppressed, or a staged for further review. After optional validation, the data is published 510. This publication may be to a public or private context, or to a context with use conditions. In an embodiment of the invention, certain values are published privately while aggregate values are publicly published. Optionally, collaborative feedback can be received about the data 512. This collaborative feedback can be associated with other items such as the user, the user group, a data item related to the data itself (such as data source, source language, source region and the like) and the like. This collaborative feedback may be a factor in business processes such as participant payment, a point system for system privileges, and the like. This collaborative feedback may be collected explicitly from users or implicitly based on the use of the data that has been submitted.

Figure 6:
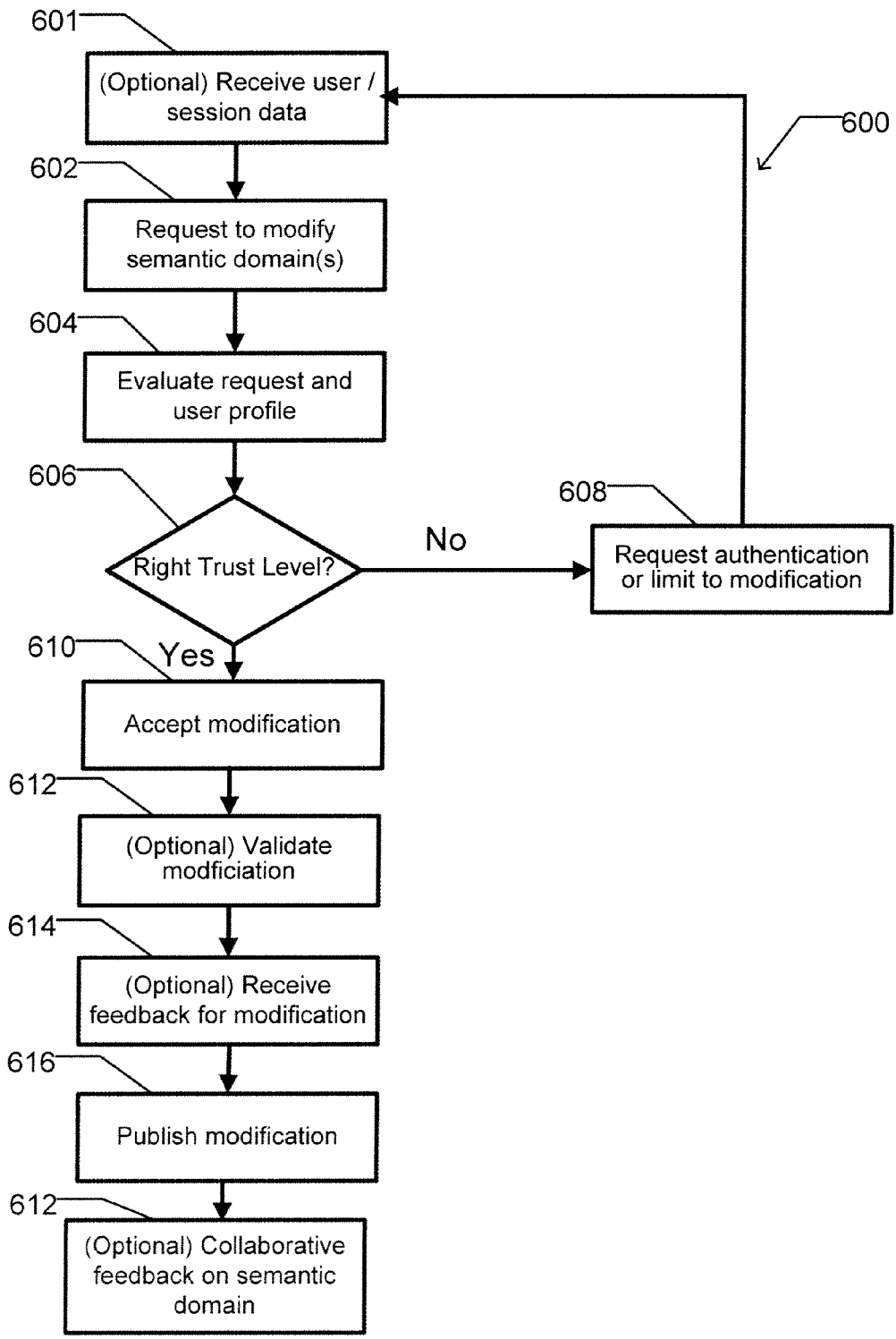
FIG. 6 illustrates a workflow for modifying a semantic domain associated with an embodiment of the invention.

FIG. 6 illustrates a workflow 600 for submitting modifications to a semantic domain where the modifications may be alterations to existing terms and definitions, addition of new terms and definitions, adding additional calculation formulas and relationship definitions, deletions of existing terms and definitions and the like. The modifications can include adding a full semantic domain with a wide range of terms and definitions and relationships defined between the terms.

User and session data is optionally received 601. This information is used to determine whether a user has the appropriate level of privilege or trust for a submitted change to be accepted. A request is received to modify semantic domain(s) 602. Evaluate request and user profile 604 evaluates the scope of the changes being requested and the user profile that is associated with the request. It is then determined if the user has the appropriate level of trust or privilege 606. If the user has the appropriate level of trust to make the modification, the modification is accepted. Accepting the modification may lead to a number of optional evaluation steps before the modification is published. If the user does not have the appropriate level of trust, authentication is requested or limits are set for modifications 608. This request may be a simple request to resubmit authentication information, or may be more specific and suggest to the user a change within the scope of the existing privileges (such as adding semantic terms, but not deleting semantic terms), options for staging the change in a scratch workspace for consideration for the public workspace, or processes through which the user can increase their trust level to support making the requested modifications.

After modifications have been accepted 610, optional modification validation occurs 612. This validation can include evaluating the affect of the change on existing semantic domains, evaluating the change for potential duplication of existing semantic domain definitions, spell checking, function checking, unacceptable term lists and the like. Optionally, receive feedback for modification may provide an opportunity for collaborative feedback before the change is published to the final publication location. This may include a staged publication in scratch workspace that is public, publication to a workspace where only a specific group (architects, members of a business, or other defined group) has access, or a form of publication for feedback that does not make the actual altered semantic domain available, but publishes information about the proposed changes.

In one embodiment, during either or both validate modification 612 and receive feedback for modification 614 modifications to the accepted modification are proposed and the client is able to re-initiate a request to modify semantic domain(s) 602 based on these proposed modifications.

After optional validation and feedback for modification, the modifications to the semantic domain are published 616. This publication may be to a public or private context, or to a context with use conditions. In an embodiment of the invention, certain values are published privately while aggregate values are publicly published. Optionally, collaborative feedback can be received about the semantic domain 618. This collaborative feedback can be associated with other items such as the user, the user group, a data item related to the data itself (such as data source, source language, source region and the like) and the like. This collaborative feedback may be a factor in business processes such as participant payment, a point system for system privileges, and the like. This collaborative feedback may be collected explicitly from users or implicitly based on the use of the modified aspects of the semantic domain.

Figure 7:
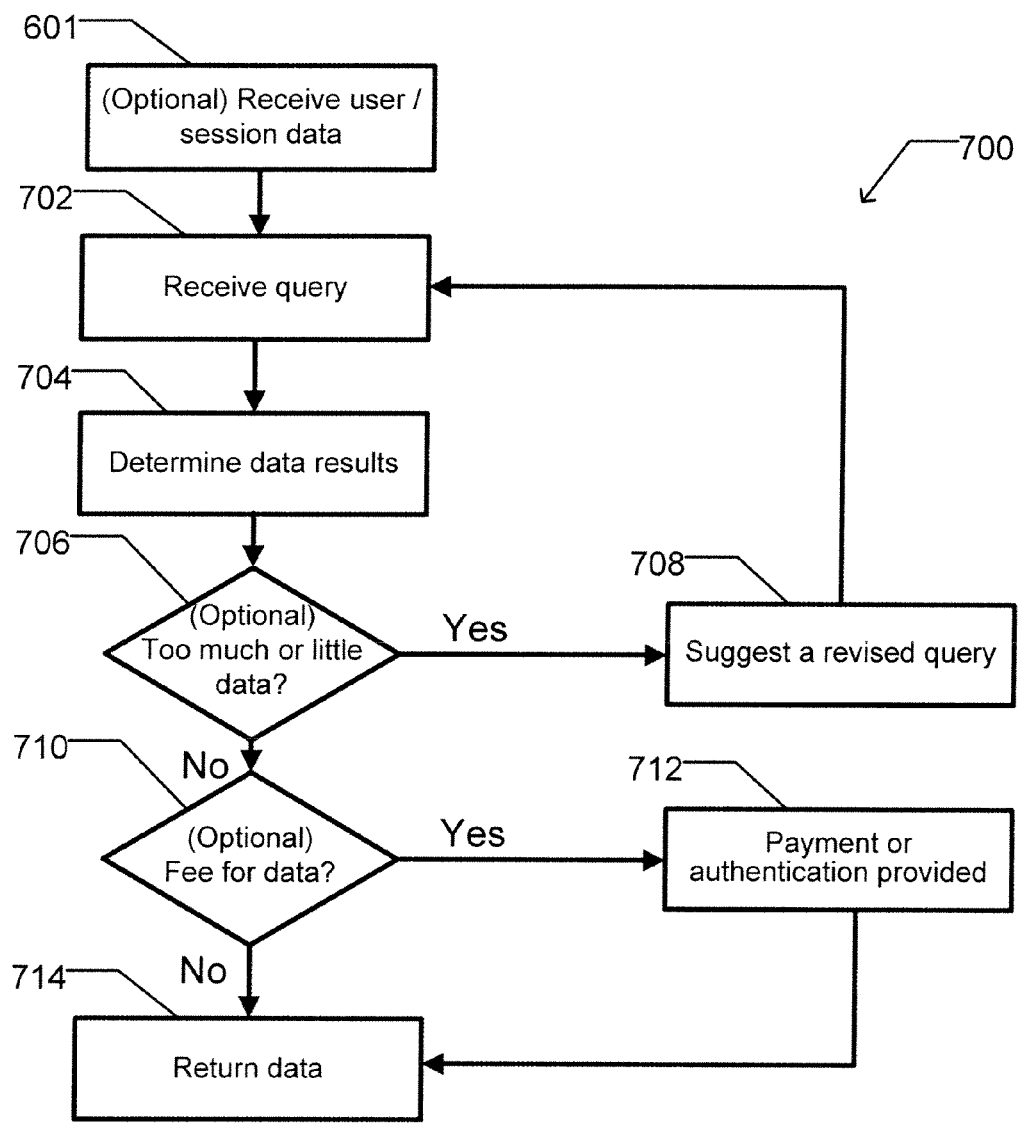
FIG. 7 illustrates a workflow for submitting a query in association with an embodiment of the invention.

FIG. 7 illustrates a workflow 700 for querying the system and returning data. The query is processed by the query parsing module 212 in conjunction with the query optimization logic module 216.

A query is received 702. The data query module 116 is used by a client to submit a query. The query may be provided based on constrained, partially constrained, or unconstrained value entry depending on the embodiment of the invention. Determine data results 704 provides an initial set of potential data that matches the query. In one embodiment, the data results are returned at this point, in another embodiment the likely attributes of the data results are calculated, and in yet another embodiment a set of potential data without associated values is determined. The set of potential data that the query is applied to may depend on the user identity, including privilege level, membership in groups, subscriptions and the like. Optionally, determine if there is too much or too little data 706. If the result set falls above or below a threshold, a revised query is suggested 708. This revised query may be automatically submitted without user interaction or may be supplied to the user as one or more query options that the user may elect to select. Optionally, determine if there is a fee associated with all or a portion of the returned data 710 and if there is, receive payment or authentication 712 for access to the data. If payment or authentication is not provided, in one embodiment a partial data set including the public or free data is returned. Data is then returned 714. In one embodiment of the invention, logic supplied by the query optimization logic module 216 facilitates the return of a partial result set; additional values can continue to be retrieved either automatically or based on a trigger.

Figure 8:
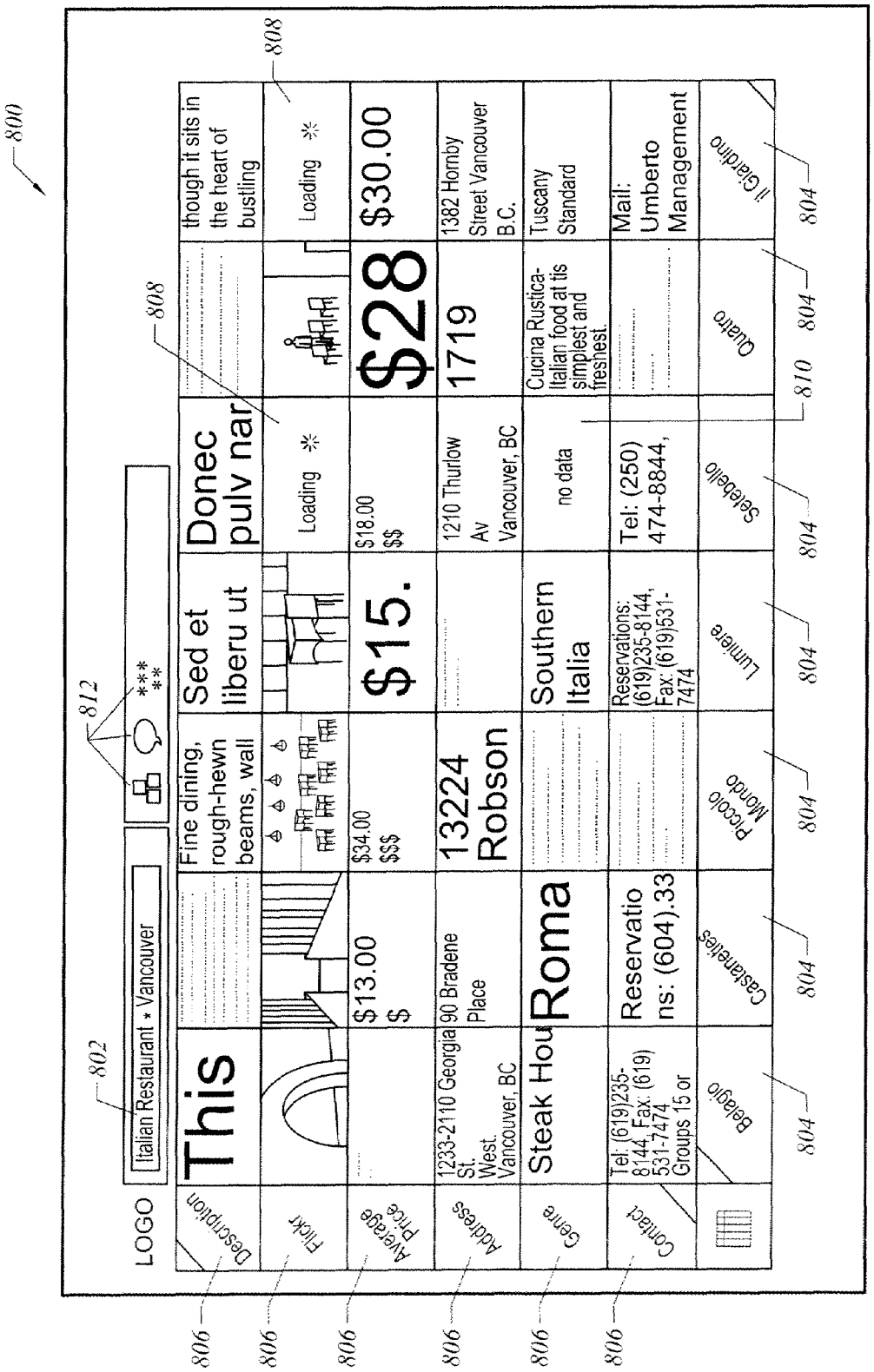
FIGS. 8 and 9 illustrate user interfaces associated with embodiments of the invention.

FIG. 8 illustrates a graphical user interface (GUI) 800 associated with an embodiment of the invention. This GUI displays a data set where each column represents a different object and each row contains a range of information for this object. In this case a search 802 for Italian Restaurant+Vancouver has returned a number of restaurants 804 as columns and data for a number of attributes is displayed in the rows 806 for each column. In this case, the data provided describes the restaurants and the data includes image data related to the subject, in this case the restaurant. Of note are the squares 808 that indicated data is being loaded and the square 810 indicating that there is no data available. A number of other controls 812 such as altering the view, adding comments, and ranking are also provided. Various elements in the GUI support a partial data set and collaborative interaction with the data set.

Figure 9:
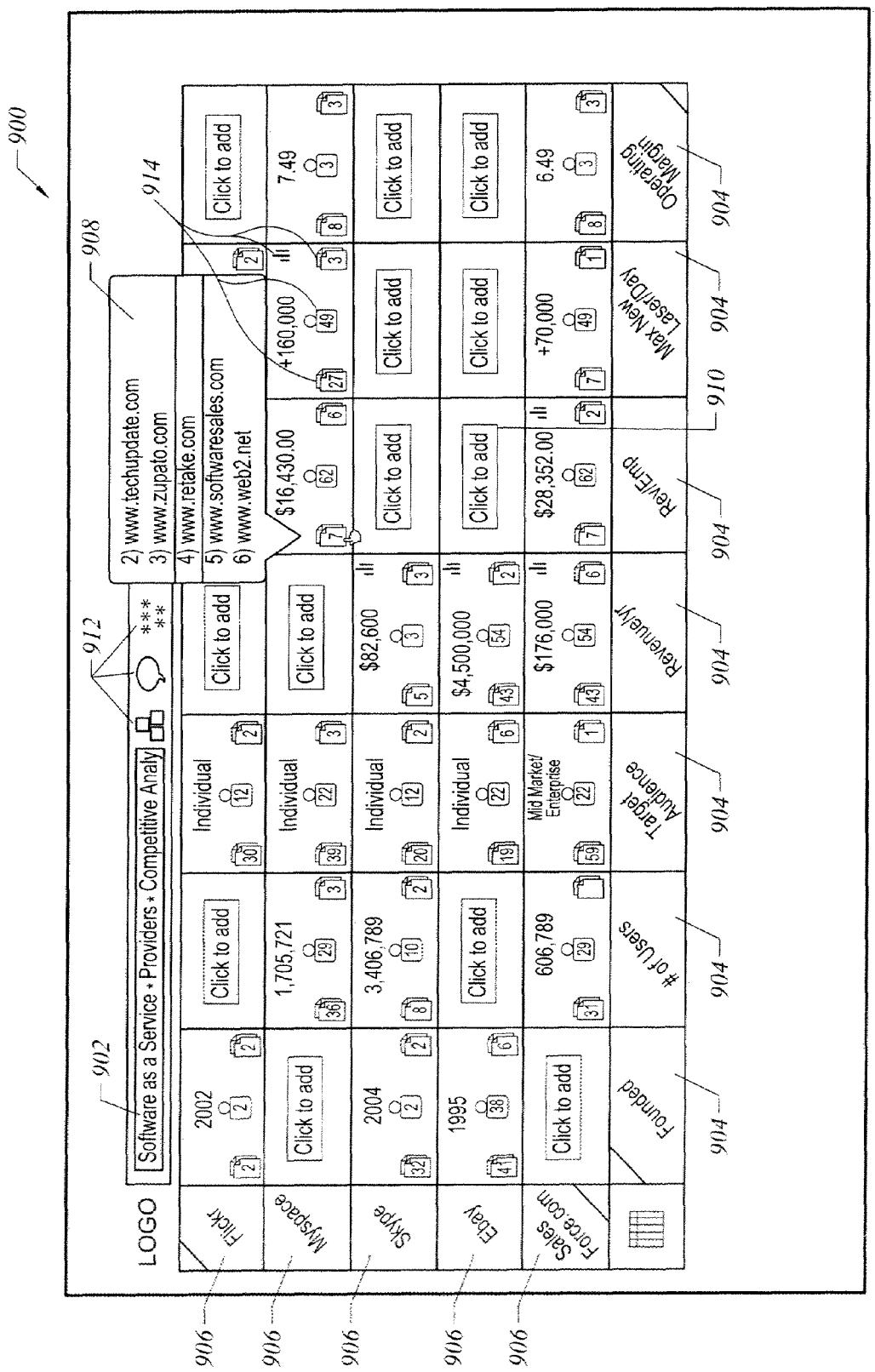

FIG. 9 illustrates a graphical user interface (GUI) 900 associated with an embodiment of the invention. This GUI displays a data set where each row represents a different object and each column contains a range of information for this object. In this case a search 902 for Software as a Service+Providers+Competitive Analysis has returned a number of Software as a Service Provider as rows 906 and data for a number of attributes associated with them displayed in the columns 904, where each row represents a provider and each column provides data for an attribute associated with the provider. Of note are the squares where the user has the option to add the data to the set of data retrieved, such as 910. A range of icons on each data square in the table provides metadata about the data item 914. This metadata includes the source(s) for the data, the users associated with the data, links to the data, other views of the data, and the like. Clicking these icons may change the main window display or open a new window. Dialog 908 is an example of the GUI displaying the metadata associated with the data after the user has selected to view this data. Various GUI strategies, such as color coding and number of indicators may be used to increase the meaning provided by these metadata icons. Optionally, the data may also be available in a chart view. In one embodiment, this chart view is displayed by clicking an icon displayed in an upper portion of the data square. A number of other controls are also supplied to interact with the data 912. Various elements in the GUI support a partial data set and collaborative interaction with the data set.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer readable storage medium, comprising computer executable instructions to:
provide to a community of users a semantic domain with a plurality of semantic definitions associated with one or more subject areas;
receive a proposed modification to the semantic domain from a user within the community of users, wherein the proposed modification to the semantic domain is selected from one or more of:
an addition of a semantic definition to the plurality of semantic definitions,
a modification of a semantic definition within the plurality of semantic definitions, and
a deletion of a semantic definition from the plurality of semantic definitions;
link the proposed modification with a semantic definition from the plurality of semantic definitions to create a mapping;
evaluate the proposed modification and the mapping; and
publish the proposed modification to the community of users.

2. The computer readable storage medium of claim 1 further comprising executable instructions to receive a proposed modification with an association between a portion of data in a data input with the semantic definition from the plurality semantic definitions.

3. The computer readable storage medium of claim 1 further comprising executable instructions to receive a proposed modification with an association between a portion of data in a data input with another portion of existing data in a data source, wherein a data source underlies the semantic domain.

4. The computer readable storage medium of claim 1 further comprising executable instructions to receive an association of metadata with a portion of data.

5. The computer readable storage medium of claim 1 further comprising executable instructions to validate a data input.

6. The computer readable storage medium of claim 5 wherein the executable instructions to validate the data input include executable instructions to validate a trust level.

7. The computer readable storage medium of claim 1 further comprising executable instructions to stage the proposed modification prior to publication.

8. The computer readable storage medium of claim 1 further comprising executable instructions to receive feedback from a plurality of users about the proposed modification.

9. A computer readable storage medium, comprising computer executable instructions to:
provide a semantic domain with a plurality of semantic definitions associated with one or more subject areas;
receive a proposed modification to the semantic domain from a user within a group of users, wherein the proposed modification to the semantic domain is selected from one or more of:
an addition of a semantic definition to the plurality of semantic definitions,
a modification of a semantic definition within the plurality of semantic definitions, and
a deletion of a semantic definition from the plurality of semantic definitions;
evaluate the proposed modification; and
publish the proposed modification to the semantic domain and the group of users.

10. The computer readable storage medium of claim 9 further comprising executable instructions to validate the proposed modification.

11. The computer readable storage medium of claim 10 wherein the executable instructions to validate the proposed modification include executable instructions to validate the trust level associated with the user and the proposed modification.

12. The computer readable storage medium of claim 9 wherein the executable instructions to evaluate the proposed modification include executable instructions to validate the effect the proposed modification has on a set of related semantic definitions in the plurality of semantic definitions, wherein the set of related semantic definitions are related to a semantic definition altered by the proposed modification.

13. The computer readable storage medium of claim 9 further comprising executable instructions to stage the proposed modification prior to publication.

14. The computer readable storage medium of claim 9 further comprising executable instructions to receive feedback from a plurality of users about the proposed modification.

15. The computer readable storage medium of claim 9 further comprising executable instructions to specify a private, public or conditionally available semantic domain.

16. The computer readable storage medium of claim 9 further comprising executable instructions to provide an additional semantic domain, wherein the proposed modification to the semantic domain includes a modification to the additional semantic domain.

17. The computer readable storage medium of claim 16 wherein the proposed modification includes a change to a link from a first representative semantic definition in the first semantic domain and a second representative semantic definition in the additional semantic domain.

* * * * *